(12) United States Patent
Li et al.

(10) Patent No.: US 9,989,671 B2
(45) Date of Patent: Jun. 5, 2018

(54) TUNNEL CONSTRUCTION LARGE-SCALE INTEGRATED GEOPHYSICAL ADVANCED DETECTION MODEL TEST DEVICE

(71) Applicant: SHANDONG UNIVERSITY, JiNan, ShanDong Province (CN)

(72) Inventors: Shucai Li, JiNan (CN); Bin Liu, JiNan (CN); Lichao Nie, JiNan (CN); Lei Xu, JiNan (CN); Xiangxue Ma, JiNan (CN); Chuanwu Wang, JiNan (CN); Zhengyu Liu, JiNan (CN); Jie Song, JiNan (CN); Huaifeng Sun, JiNan (CN); Xinji Xu, JiNan (CN); Yao Li, JiNan (CN)

(73) Assignee: SHANDONG UNIVERSITY, Jinan (CN)

( * ) Notice: Subject to any disclaimer, the term of this patent is extended or adjusted under 35 U.S.C. 154(b) by 891 days.

(21) Appl. No.: 14/397,547

(22) PCT Filed: Jan. 26, 2014

(86) PCT No.: PCT/CN2014/000100
§ 371 (c)(1),
(2) Date: Oct. 28, 2014

(87) PCT Pub. No.: WO2015/103720
PCT Pub. Date: Jul. 16, 2015

(65) Prior Publication Data
US 2015/0338549 A1    Nov. 26, 2015

(30) Foreign Application Priority Data

Jan. 7, 2014 (CN) .......................... 2014 1 00071717
Jan. 7, 2014 (CN) .......................... 2014 2 00087867

(51) Int. Cl.
*G01V 99/00* (2009.01)
*G01V 11/00* (2006.01)
(Continued)

(52) U.S. Cl.
CPC ............ *G01V 99/005* (2013.01); *G01V 11/00* (2013.01); *G01V 1/30* (2013.01); *G01V 3/165* (2013.01); *G01V 3/17* (2013.01)

(58) Field of Classification Search
CPC .............................. G01V 99/005; G01V 11/00
See application file for complete search history.

(56) References Cited

U.S. PATENT DOCUMENTS

2017/0218757 A1*   8/2017 Li .......................... E21B 49/087

OTHER PUBLICATIONS ip.com machine translation of CN 101526629A published Sep. 9, 2009.*

(Continued)

*Primary Examiner* — John Fitzgerald
(74) *Attorney, Agent, or Firm* — Oliff PLC

(57) ABSTRACT

The present invention presents a tunnel construction large-scale integrated geophysical advanced detection model test device. The model test device includes a tunnel surrounding rock, a main tunnel model, a model test case, a water-containing geological structure device, a numerical control automated construction device and a main control chamber. The model test device is a large-scale integrated geophysical advanced detection model test device meeting the detection using a seismic wave method, an electromagnetic method and a direct-current electric method. By using the geophysical advanced detection model test device, the geophysical response features of the water-containing geological structure device in front of a tunnel face may be studied, multiple geophysical advanced detection forward and inversion methods for the water-containing geological structure device are verified, and the relationship between some geophysical (Continued)

detection method results and water burst quantity is studied, for the advanced prediction and water burst quantity prediction in actual engineering.

26 Claims, 3 Drawing Sheets

(51) Int. Cl.
 *G01V 1/30* (2006.01)
 *G01V 3/165* (2006.01)
 *G01V 3/17* (2006.01)

(56) References Cited

OTHER PUBLICATIONS ip.com machine translation of CN 101603423A, published Dec. 16, 2009.*
Qi, Taiyue et al. "Physical Simulation of the Transient Electromagnetic Response Throughout a Whole Tunnel". vol. 50, No. 1, 53-59, 2013. Modern Tunnelling Technology.
Zhao, Jia-fu et al. "An Experiment Study on 2D Ultrasonic Physics Model of Cave". vol. 35, 90-94, 2005. Journal of Jilin University (Earth Science Edition).

* cited by examiner

TUNNEL CONSTRUCTION LARGE-SCALE INTEGRATED GEOPHYSICAL ADVANCED DETECTION MODEL TEST DEVICE

FIELD OF THE INVENTION

The present invention relates to a geophysical advanced detection model test device, and in particular relates to a tunnel construction large-scale integrated geophysical advanced detection model test device.

BACKGROUND OF THE INVENTION

When entering the 21$^{st}$ century, the worldwide infrastructure construction is ushered in the climax of "underground space" development, and the scale and quantity of tunnel construction serving as a main structural form of underground engineering are increasing. Tunnels are mainly divided into highway and railway traffic tunnels, water conservancy transfer tunnels, municipal pipeline tunnels, mine tunnels and the like. For the tunnel engineering constructed under complex geological conditions, the geological status of a line region is difficult to verify at the early geological exploration stage, so that geological disasters such as water and mud outburst, collapse and large deformation frequently happen in construction, and the construction safety is seriously affected. For example, Japan's Seikan undersea tunnel was submerged twice in 1969 and 1976 due to water outburst accidents, wherein 33 persons died, more than 1,300 persons were disabled, and the construction period was delayed by more than 2 years; and in the construction process of China's Yuanliangshan Tunnel, totally 71 times of large-scale mud and stone outburst and water and sand burst happened, the construction safety was seriously threatened, and the construction period was delayed. Therefore, advanced detection is quite necessary for the geological condition in front of a tunnel face, to detect the geological structure which may induce geological disasters, such as a karst cave, an underground river, a fault or the like.

Advanced geological prediction of a tunnel is to detect the geological condition in front of an excavated face of the tunnel by means of drilling, geophysical exploration and the like, and master the structure and property of a tunnel surrounding rock in front as well as the condition of the unfavorable geological structure such as a karst cave, an underground river, a fault or the like before construction, so as to provide guidance for further construction, avoid the geological disasters such as water and mud outburst, collapse and large deformation and ensure the construction safety. In the study and practice of the advanced geological prediction of a tunnel construction period, it is discovered that the detection effect of a single method is not ideal and the problems of inaccurate qualitative judgment, low positioning precision and the like always appear due to the multiplicity of geophysical inversion interpretation and the complexity of environment detection, so that false reporting, underreporting or misreporting is produced, and serious hidden danger is caused for the construction safety. To improve the reliability and accuracy of the advanced geological prediction, multiple prediction methods are combined with each other to implement integrated advanced geological prediction, and various prediction results are verified by each other and complemented with each other, so that the detection effect may be effectively improved.

To disclose the geophysical response characteristics of a typical unfavorable geology, establish a three-dimensional positioning and water quantity estimation and quantitative identification method for the unfavorable geology in front of a tunnel, research and develop a novel geophysical detection technology, verify the detection effect and evaluate the performance of the devices, it is very important to establish a tunnel construction large-scale integrated geophysical advanced detection model test device. The geophysical detection model test, which may be used for constructing a known geological condition and simulating a real detection environment and a detection object, plays a very important role in verifying the detected performance effect.

The physical model test of geophysical detection indicates that a similar model is built from a physical prototype of a medium in a test room based on the physical and geometrical similarity criteria according to a certain scale factor, to simulate the real detection environment in the actual geological condition. A relationship between the model structure, structure, physical properties and change rule of the medium and the characteristics and change of a geophysical field is established by observing the geophysical field in the model. The physical prototype may be studied and detected by using the relationship according to the geophysical field observed on the physical prototype of the medium. The geophysical detection test is an important path and means for basic theory and method technical studies of solid geophysics and exploration geophysics.

In view of development of the present model test, the existing model test has the limitation of single detection means, small scale, single simulated geological type, material non-repeatability and the like, e.g. the model test device in the document Goaf Two-Dimensional Ultrasonic Physical Model Experimental Studies (Zhao Jiafu, Journal of Jilin University) only aims at a seismic wave method, and the model consisting of an organic glass plate of 80 cm×20 cm×0.3 cm and a water trough is small in scale; and the model test in the document Physical Simulation of Total Space Transient Electromagnetic Response in Tunnel (Qi Taiyue, Modern Tunnelling Technology) only aims at a transient electromagnetic method, the model size is 4 m×2 m×1.5 m, the internal material is fixed and the simulated geological type is single.

With respect to the investigation of the existing technology, the tunnel construction integrated advanced geological prediction physical simulation technology and devices face the following main problems: (1) for realizing similarity physical simulation of three detection methods including a seismic wave method, an electromagnetic method and a direct-current electric method, the similarity principles of the detection methods are different from each other, and the requirements for parameters of test materials are also different from each other, so it is difficult to find a similar material capable of simultaneously satisfying the three detection methods; (2) for really simulating the actual geological condition and detection environment and meeting the boundary requirements of propagation of a seismic wave field, an electromagnetic field and a direct-current electric field, large size and scale of the physical model test device is required; (3) multiple water-containing geological structure devices for karst caves, underground rivers, faults and the like are used in actual construction, and in order to classify and study the geophysical response and detection identification effects of the typical water-containing geological structure devices, different types of water-containing geological structure devices need to be simulated in the physical model test; (4) because the cost of the physical model test is relatively high, and if only the single geological condition is simulated, geological abnormal bodies and similar materials are not replaceable or reusable, the study cost is greatly increased, and quick arrangement of different types of abnormal bodies is required to simulate different geological conditions; (5) each existing physical model test device is only designed for a certain detection means, however, the geophysical detection has the characteristics of multiplicity and detection environment complexity, the physical test device is required for multiple detection methods such as the seismic wave method, the electromagnetic method and the direct-current electric method, and the results of these detection means need to be compared and verified, whereas how the observation systems of various detection means are arranged in a physical model so as not to interfere with each other is a problem.

SUMMARY OF THE INVENTION

For solving the above-mentioned problems, the aim of the present invention is to provide a tunnel construction large-scale integrated geophysical advanced detection model test device capable of meeting the detection requirements of an integrated induced polarization method, a transient electromagnetic method, a seismic wave method, a borehole radar method and a resistivity CT method and realizing multiple geophysical integrated detection.

To fulfill the above-mentioned purposes, the present invention adopts the following technical scheme.

A tunnel construction large-scale integrated geophysical advanced detection model test device includes a tunnel surrounding rock, a main tunnel model, a model test case, a water-containing geological structure device, a numerical control automated construction device, horizontal detection boreholes and a main control chamber, wherein the tunnel surrounding rock is filled in the model test case, the main tunnel model of a model test is positioned in the middle of the front of the model test case, the water-containing geological structure device is arranged in front of the main tunnel model, the numerical control automated construction device is mounted on the top of the model test case, the horizontal detection boreholes are arranged in the model test device, and the main control chamber is positioned outside the model test case and communicates with the water-containing geological structure device and the numerical control automated construction device.

The tunnel surrounding rock is used for simulating the condition of the tunnel surrounding rock in actual tunnel construction and is a similar material simultaneously meeting the requirements of seismic wave field, electromagnetic field and direct-current electric field detection for resistivity and wave velocity, and the similar material is formed by mixing and compacting the following components in parts by mass:

| | |
|---|---|
| soil | 100 parts |
| cement | 4-20 parts |
| gravel | 10-25 parts, | wherein the water content of the soil is controlled to be 8-16%, and the compactness of the whole similar material is controlled to be 0.75-0.95; the soil and the gravel are aggregates of the similar material, the cement is a cementing agent, the gravel is 3-4 meshes, and the cement is directly mixed as dry powder; and the wave velocity of the similar material is 230-1,260 m/s, and the resistivity of the similar material is 20-340 Ωm.

A preparation method of the tunnel surrounding rock includes the following steps:
(1) finding out the values of appropriate water content and compactness according to the resistivity and wave velocity parameters of required materials and the relationship curve among the wave velocity, resistivity, water content and compactness;
(2) excavating a plurality of underground soil samples, drying, exposing in the sun or adding water to ensure that the water content of the soil reaches the predefined water content, and sieving out a plurality of gravel with the diameters of 3-4 meshes through a sieve;
(3) respectively weighing the raw materials, putting the raw materials into a stirrer and fully stirring the raw materials;
(4) putting the mixed material into a model, stacking layer by layer, and performing artificial ramming to reach the predefined compactness.

The main tunnel model includes a tunnel model face and a tunnel model cavity which are connected with each other to form a whole; the tunnel model cavity is divided into an inner layer and an outer layer, the inner layer includes a shell and annular inner reinforcing ribs positioned in the shell and used for restraining the radial deformation of the shell, and the outer layer is provided with annular outer reinforcing ribs and axial outer reinforcing ribs positioned outside the shell and used for restraining the radial and axial deformation of the tunnel model cavity respectively; and electrode mounting holes, electromagnetic method coil supports, a borehole radar detection hole and a transient electromagnetic advanced probe placing hole are arranged on the tunnel model face respectively, seismic wave method induced measuring points and receiving measuring points are arranged on the tunnel model face, the cross section of the inner layer shell of the tunnel model cavity has a symmetrical structure formed by six arcs of a five-center circle, and the whole cross section is in the shape of a pebble which has a narrower top and a wider bottom and is smooth on the circumference. The borehole radar detection hole and the transient electromagnetic advanced probe placing hole are positioned in the feet of two sides of the tunnel model face respectively, and are cylindrical and identical in size.

The electrode mounting holes are cylindrical and are reserved in the tunnel model face according to the measuring line arrangement requirement of a direct-current electric method or an induced polarization method, and electrodes are mounted in the electrode mounting holes according to actual needs.

Four electromagnetic method coil supports are reserved on the tunnel model face according to the arrangement requirement of transient electromagnetic method coils, and the four supports form a rectangle.

The model test case has a reinforced concrete structure, the geometrical factor ratio G of the whole model test device is 6, and the geometrical factor ratio is the geometrical dimension ratio of a prototype to a model.

The water-containing geological structure device includes a freely molded water-containing structure shell with a controllable permeability coefficient, a water inlet pipe, a water outlet pipe, a water inlet flow control device, a water outlet flow control device, a water tank and a water wave velocity controllable device, wherein the water inlet pipe and the water outlet pipe are arranged on two sides of the water-containing structure shell respectively, the water inlet flow control device is fixed on the water inlet pipe, the water outlet flow control device is arranged on the water outlet pipe, one end of the water inlet pipe is connected with the water tank, and parts of the water inlet pipe and the water outlet pipe, positioned in the water-containing structure shell, are respectively provided with a plurality of water inlets and water outlets forming a plurality of water passages; and the water-containing structure shell is also connected with the water wave velocity controllable device based on pneumatic powder spray.

The water inlet pipe and the water outlet pipe are respectively connected to the water-containing structure shell through water flow direction control devices, and parts of the water inlet pipe and the water outlet pipe, positioned in the water-containing structure shell, are respectively divided into pipelines in multiple directions through the water flow direction control devices.

The water wave velocity controllable device includes a computer, wherein the computer is respectively connected with an air compressor and acoustic emission transducers, the air compressor is connected with one end of a porous discharge pipe inserted into the water-containing structure shell, a plurality of parallel pipelines are arranged at the other end of the porous discharge pipe, and the acoustic emission transducers are positioned in the water-containing structure shell.

The water inlet flow control device includes a flow controller, wherein the flow controller is connected with the computer and also connected with a frequency converter, the frequency converter is connected with a variable frequency motor, the variable frequency motor is connected with a water inlet flow meter, and the water inlet flow meter is connected with the computer and mounted in the water inlet pipe. The water outlet flow control device includes a flow controller, wherein the flow controller is connected with the computer and also connected with a frequency converter, the frequency converter is connected with a variable frequency motor, the variable frequency motor is connected with a water outlet flow meter, and the water outlet flow meter is connected with the computer and mounted in the water outlet pipe.

Each water flow direction control device is a three-way electromagnetic valve which is connected with the computer.

The water-containing structure shell is molded by adopting a pervious material with good permeability and controllable permeability coefficient. The water-containing structure shell is formed by molding 1 part of cement, 1.25-2.05 parts of water granulated slag, 0.50-1.25 parts of gravel, FRP ribs and 0.3-0.75 part of water by mass.

A manufacturing method of the water-containing geological structure device includes the following steps:
(1) casting the water-containing structure shell: selecting an appropriate steel mold and a template according to the type and shape of the water-containing structure to be manufactured, and arranging and binding the FRP ribs at set intervals in the steel mold; selecting a mixing ratio according to the set permeability coefficient requirement, stirring the cement, water granulated slag and gravel uniformly in a stirrer, then adding water, and stirring uniformly; then pouring the mixture into the steel mold and the template, performing vibratory ramming, and molding; demolding after the set time, and curing for a few days according to the concrete curing provision;
(2) mounting the water wave velocity controllable device based on pneumatic stirring: adding excessive plastic powder into water in the water-containing structure shell through the air compressor to form a suspension, fixing the acoustic emission transducers according to a fixed distance, fixing the porous discharge pipe, connecting the computer with the air compressor and the acoustic emission transducers respectively, and connecting the air compressor with the porous discharge pipe;
(3) mounting the water inlet and outlet flow control devices and the water flow direction control devices: connecting the flow controllers with two frequency converters respectively, connecting the two frequency converters with the variable frequency motors respectively, and connecting the variable frequency motors with the water inlet flow meter and the water outlet flow meter respectively; connecting the water flow direction control devices with the computer, the water flow direction control devices being mounted at two ends of the water-containing structure shell; connecting the water inlet pipe and the water outlet pipe with the water-containing structure shell respectively;
(4) hoisting and burying the water-containing geological structure device: excavating the filled model to an appropriate depth on the multifunctional tunnel advanced geological prediction physical model test device with set length, width and height according to a designated position by using a rotary excavating device, hoisting the water-containing geological structure device to the excavated position by using a travelling hoist, burying the similar material of the excavated surrounding rock, and ramming;
(5) setting the elastic wave velocity, flow and flow direction of water through the computer, and controlling the corresponding devices to work.

When the water-containing structure shell is cast in (1), two holes with the diameters of 3 cm need to be reserved on two sides of the water-containing structure shell, for mounting the water inlet and outlet pipes respectively; meanwhile, a hole with the diameter of 2 cm needs to be reserved in the shell, for mounting a porous discharge pipe connecting pipe in the water-containing structure; in addition, a square hole of 0.2×0.2 m also needs to be reserved in the water-containing structure shell, a cover matching the size of the square hole is manufactured, the square hole is used for filling a solid filling material, and the manufactured cover is fixed on the shell by using bolts after filling to plug the reserved square hole.

The numerical control automated construction device includes horizontal guide rails fixed at the top end of the model test case, a double girder gantry crane moving on the horizontal guide rails along the direction of the guide rails, a 360° rotatable soil taking device and an abnormal body carrying device which are mounted on the double girder gantry crane, and an integrated numerical control operating system for realizing the functions of ranging, feedback and real-time display, wherein the double girder gantry crane moves along the horizontal guide rails, and the 360° rotatable soil taking device moves along the double girder gantry crane or moves vertically downwards.

The double girder gantry crane consists of a full-gantry main girder and leg supports fixed at two ends of the full-gantry main girder, wherein the main girder has a double-girder structure, a trolley track is designed on the main girder, and each single girder of the main girder is designed into a box girder structure.

Each leg support includes two oblique legs, an end girder at the bottom and a travelling mechanism, wherein the two oblique legs form an A-shaped support and are connected with the travelling mechanism through the end girder at the bottom. Steel plate buckles for preventing the crane from being separated from the track are designed on two sides of the travelling mechanism.

The 360° rotatable soil taking device includes a four-wheeled trolley, a rotating mechanism, a guide rod, a grab bucket and a main hydraulic system.

The four-wheeled trolley moves on the trolley track of the full-gantry main girder, the guide rod is connected with the four-wheeled trolley through a guide rod hole in the four-wheeled trolley and connected with the grab bucket through the rotating mechanism, the guide rod is telescopic, and the main hydraulic system is used for driving the rotation and normal operation of the grab bucket and the extension and retraction of the guide rod.

The abnormal body carrying device includes a hoist and a travelling component connected with the hoist, wherein the travelling component moves along one single girder of the main girder of the double girder gantry crane.

The integrated numerical control operating system may realize the ranging and feedback functions and display the working state of the whole device in real time, and is designed to have an automatic control mode and a manual control mode.

There are totally three pairs of horizontal detection boreholes, wherein one pair of boreholes is positioned in front of the main tunnel face and used for mounting of a transient electromagnetic method advanced probe, mounting of a resistivity CT method electrode and delivery of a borehole radar method antenna, and the other two pairs of boreholes in which measuring electrodes are mounted penetrate through the whole model test device and are respectively positioned at the upper left, upper right, lower left and lower right parts of the model test device and used for detection of a resistivity CT method and a borehole radar method.

The main control chamber is used for controlling and displaying each operation in the test, and communicates with the water-containing geological structure device and the numerical control automated construction device.

An integrated geophysical advanced detection method using the above-mentioned detection model test device includes the following detection steps:
(1) pre-burying of a geological abnormal body: after the three-dimensional position of the pre-buried geological abnormal body in the model test is determined, performing quick three-dimensional positioning excavation in the tunnel surrounding rock by using the numerical control automated construction device, carrying and burying the water-containing geological structure device to a pre-defined position in front of the main tunnel model, and backfilling and ramming the tunnel surrounding rock;
(2) connection of detection devices and detection test, specifically including:
1) selection of a detection method and connection of devices: selecting a detection method according to the test requirement, such as an induced polarization method, a transient electromagnetic method, a seismic wave method, a borehole radar method and a resistivity CT method, and connecting the detection devices matched with the detection method for the geophysical advanced detection test;
2) selection of electrodes and horizontal detection boreholes: selecting the electrodes or the horizontal detection boreholes required for the corresponding method according to the selected detection method, wherein the induced polarization method needs the electrodes arranged on the main tunnel face and the tunnel cavity, and the borehole radar method and the resistivity CT method need two random boreholes selected according to the three-dimensional position of the pre-buried water-containing geological structure device, so as to ensure that the water-containing geological structure device is positioned between the horizontal detection boreholes;
3) detection and verification of detection results: performing various geophysical advanced detections under the coordination action of the detection devices and the electrodes or the boreholes, performing geophysical inversion on the acquired detection data to obtain response results of the water-containing geological structure device so as to obtain information such as the three-dimensional position and size of the detected water-containing geological structure device, and verifying the information with information such as three-dimensional position and size of the actual buried water-containing geological structure device to judge the accuracy of various detection methods.

The present invention has the beneficial effects:
1, the present invention proposes the extra large-scale integrated geophysical advanced detection model test device integrating the induced polarization method, the transient electromagnetic method, the seismic wave method, the borehole radar method and the resistivity CT method, and the tunnel surrounding rock, the main tunnel model, the model test case, the water-containing geological structure device, the numerical control automated construction device and the main control chamber are reasonably designed in the whole model test device, so that multiple geophysical integrated detection is realized;
2, the present invention proposes the similar material simultaneously meeting the multi-field similarity requirements of a seismic wave field, an electromagnetic field and a direct-current electric field, and the similar material consists of silty clay, cement and gravel and meets the requirements of the seismic wave field, electromagnetic field and direct-current electric field detection methods for the resistivity 200 Ωm and the wave velocity 1000 m/s by controlling the water content and the compactness, so that the actual geological condition may be simulated more accurately;
3, the present invention proposes the water-containing geological structure device with controllable parameters, and the water-containing geological structure device includes the water velocity controllable device based on the pneumatic stirring device, water flow and flow direction control systems and the freely molded water-containing geological structure device shell with a controllable permeability coefficient, realizes controllable adjustment of the water wave velocity and control of water flow and flow direction, meets the requirements of multiple geophysical fields of the seismic wave method, the electromagnetic method and the direct-current electric method and realizes control of flow and flow direction of flowing water, so that different water filling states of unfavorable geological bodies may be simulated by controlling the water flow, and the requirement of the induced polarization method for flowing water simulation is met by controlling the flow direction; multiple unfavorable geological bodies such as underground rivers, karst caves and fault zones and combinations thereof may be simulated by freely molding different shapes;
4, the present invention proposes the numerical control automated construction device for large-scale geophysical detection test, including the double girder gantry crane, the horizontal guide rails, the 360° rotatable soil taking device, the geological abnormal body carrying device, the main hydraulic system and the integrated ranging, feedback and real-time display numerical control operating system, thus realizing the full-automatic quick three-dimensional accurate positioning excavation technology in the tunnel surrounding rock of the large-scale geophysical detection test, realizing replaceability and repeatability of materials and geological abnormal bodies in the model test, and having the characteristics of low energy consumption, high efficiency, strong operability and high safety;

5, spaces and design lines for placing multiple advanced detection devices are reserved in the whole model device, so that the electrodes and instruments may be conveniently and quickly assembled and disassembled, and the requirements for arranging the devices for multiple advanced prediction methods including the induced polarization method, the transient electromagnetic method, the seismic wave method, the borehole radar method and the resistivity CT method may be met.

Wherein, 1, tunnel surrounding rock; 2, main tunnel model; 3, model test case; 4, water-containing geological structure device; 5, numerical control automated construction device; 6, main control chamber; 7, tunnel model cavity; 8, tunnel model face; 9, shell; 10, annular inner reinforcing rib; 11, annular outer reinforcing rib; 12, axial outer reinforcing rib; 13, water outlet flow control device; 14, water inlet flow control device; 15, water tank; 16, air compressor; 17, computer; 18, three-way electromagnetic valve; 19, water outlet pipe; 20, porous discharge pipe; 21, acoustic emission transducer; 22, water inlet pipe; 23, cable; 24, double girder gantry crane; 25, horizontal guide rail; 26, 360° rotatable soil taking device; 27, abnormal body carrying device; 28, conducting wire; 29, electrode; 30, horizontal detection boreholes.

DETAILED DESCRIPTION OF THE EMBODIMENTS

The present invention will be further described below in combination with accompanying drawings and embodiments.

Figure 1:
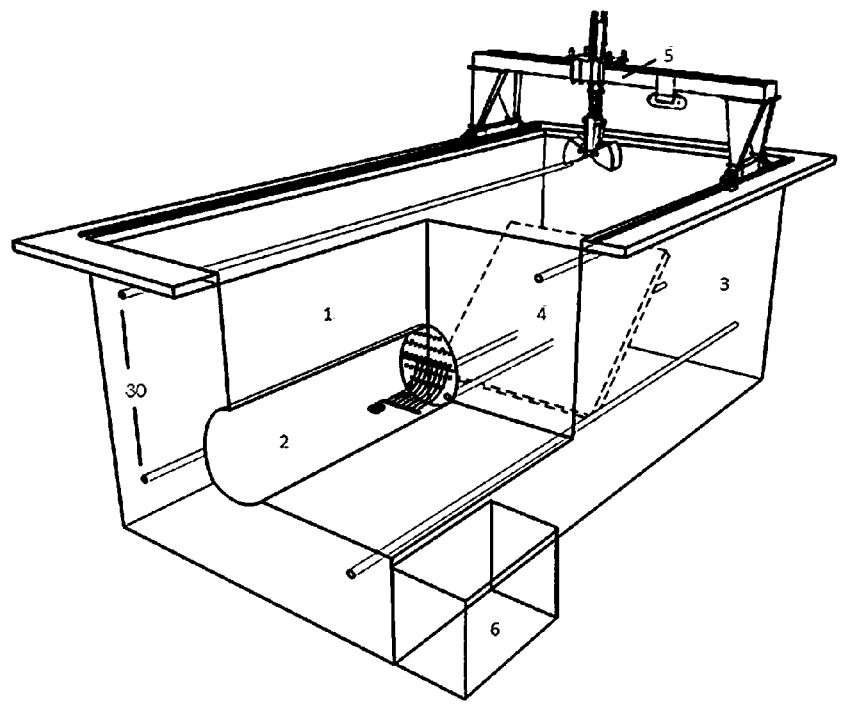
FIG. 1 is a schematic diagram of a large-scale integrated geophysical advanced detection model test device of the present invention.

Embodiment 1:

As shown in FIG. 1, a tunnel construction large-scale integrated geophysical advanced detection model test device includes a tunnel surrounding rock 1, a main tunnel model 2, a model test case 3, a water-containing geological structure device 4, a numerical control automated construction device 5, horizontal detection boreholes 30 and a main control chamber 6, wherein the tunnel surrounding rock 1 is filled in the model test case 3, the main tunnel model 2 is positioned in the middle of the front of the model test case 3, the water-containing geological structure device 4 is arranged in front of the main tunnel model 2, the numerical control automated construction device 5 is mounted on the top of the model test case 3, the horizontal detection boreholes 30 are arranged in the model test device, and the main control chamber 6 is positioned outside the model test case 3 and communicates with the main tunnel model 2, the water-containing geological structure device 4 and the numerical control automated construction device 5.

The tunnel surrounding rock 1 in the model test device is used for simulating the condition of the tunnel surrounding rock 1 in actual tunnel construction and is a similar material for seismic wave method, electromagnetic method and electric method combined detection physical model test, wherein the similar material may simultaneously meet the requirements of seismic wave field, electromagnetic field and direct-current electric field detection for resistivity and wave velocity and is simple in structure and convenient in operation.

The similar material is prepared by mixing soil, cement and gravel uniformly, and consists of the following raw materials in parts by weight: 100 parts of silty clay, 12 parts of cement and 20 parts of gravel.

A preparation method of the similar material of the tunnel surrounding rock includes the following steps:

(1) finding out appropriate water content (12%) and compactness (0.85) according to the resistivity and wave velocity parameters of required materials and the relationship among the wave velocity, resistivity, water content and compactness;

(2) excavating a plurality of underground soil samples, drying, exposing in the sun or adding water to ensure that the water content of the soil reaches the predefined water content (12%), and sieving out a plurality of gravel with the diameters of 3-4 meshes through a sieve;

(3) respectively weighing the raw materials including 100 parts of silty clay, 12 parts of cement and 20 parts of gravel, putting the raw materials into a stirrer and fully stirring the raw materials;

(4) putting the mixed material into a model, stacking layer by layer, and performing artificial ramming to reach the predefined compactness (0.85).

The similar material of the tunnel surrounding rock has the resistivity of 200 Ωm and the wave velocity of 1000 m/s as measured, and may simultaneously meet the requirements of seismic wave field, electromagnetic field and direct-current electric field detection for resistivity and wave velocity, so that the actual geological condition may be simulated more accurately.

Figure 2:
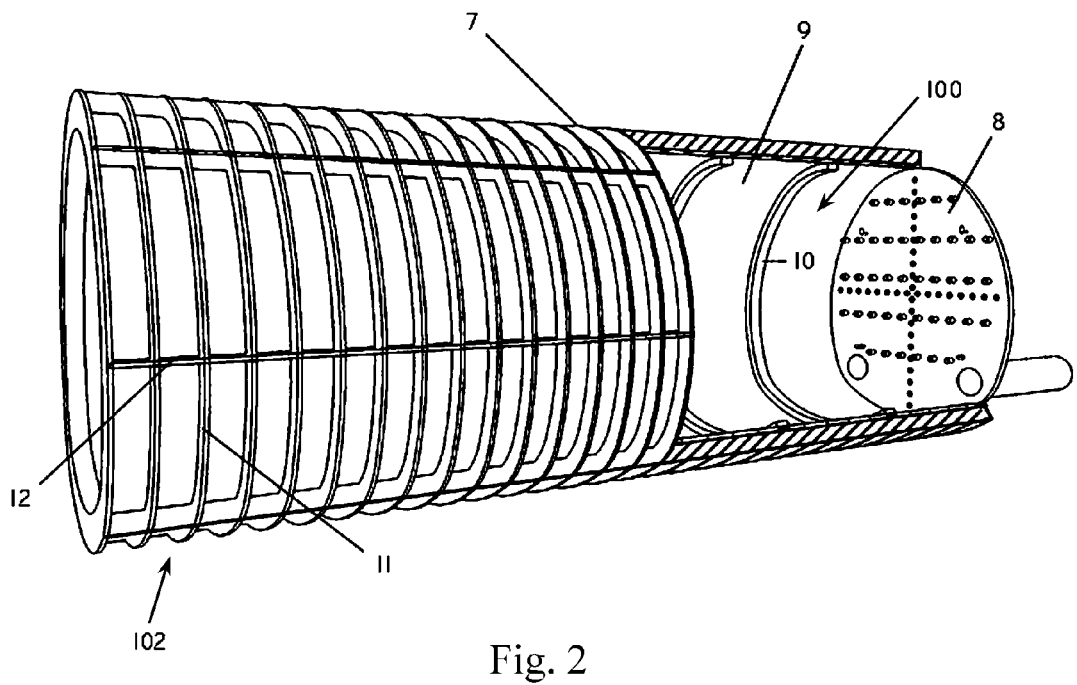
FIG. 2 is a schematic diagram of a section cutting plane of an overall structure of a main tunnel model of the present invention.

As shown in FIG. 2, a main tunnel model 2 consists of a tunnel model cavity 7 and a tunnel model face 8. The tunnel model cavity 7 is divided into an inner layer 100 and an outer layer 102, wherein the inner layer has an "annular rib pebble shell" structure and includes a shell 9 and annular inner reinforcing ribs 10; and the outer layer has a "spatial steel grid" structure and includes annular outer reinforcing ribs 11 and axial outer reinforcing ribs 12. The tunnel model face 8 is provided with electrode 4 mounting holes, electromagnetic method coil supports, a borehole radar detection hole and a transient electromagnetic advanced probe placing hole and engraved with detailed marks for recording the positions of seismic wave method induced points and receiving points.

The "annular rib pebble shell" structure consists of the shell 9 and the annular inner reinforcing ribs 10. The cross section of the shell 9 has a symmetrical structure formed by six arcs of a five-center circle, the vertical distance of the inner space of the shell 9 is about 2.0 m, the horizontal distance of the shell 9 is about 1.7 m, the wall thickness of the shell 9 is about 3 cm, and the whole cross section is similar to a pebble, having a narrower top and a wider bottom and being smooth on the circumference, so that the structure is high in strength, high in rigidity and good in stability and may bear larger top load and lateral load compared with a common tunnel model structure. The annular inner reinforcing ribs 10 are positioned in the shell 9 and used for restraining the radial deformation of the shell 9, achieve an overall reinforcing effect on the shell 9 and are arranged annularly at intervals of 1 m, the width of each reinforcing rib is about 10 cm, the height of each reinforcing rib is about 5 cm, and the shell 9 and the annular inner reinforcing ribs 10 are integrally cast to form a whole during manufacturing.

The "spatial steel grid" structure is positioned outside the shell 9, and consists of the annular outer reinforcing ribs 11 and the axial outer reinforcing ribs 12. The outer reinforcing ribs 11 have the widths of about 2 cm, heights of about 10 cm and intervals of 20 cm; the axial outer reinforcing ribs 12 have the widths of about 2 cm and heights of about 10 cm and are distributed in an axial full-length manner on the outer surface of the shell 9, and there are eight axial outer reinforcing ribs 12; the annular outer reinforcing ribs 11 and the axial outer reinforcing ribs 12 form the "spatial steel grid" structure which may greatly enhance the external pressure bearing capability of the tunnel model and reduce the radial compression and axial non-uniform deformation of the tunnel model, and are integrally cast to form a whole during manufacturing.

Figure 6:
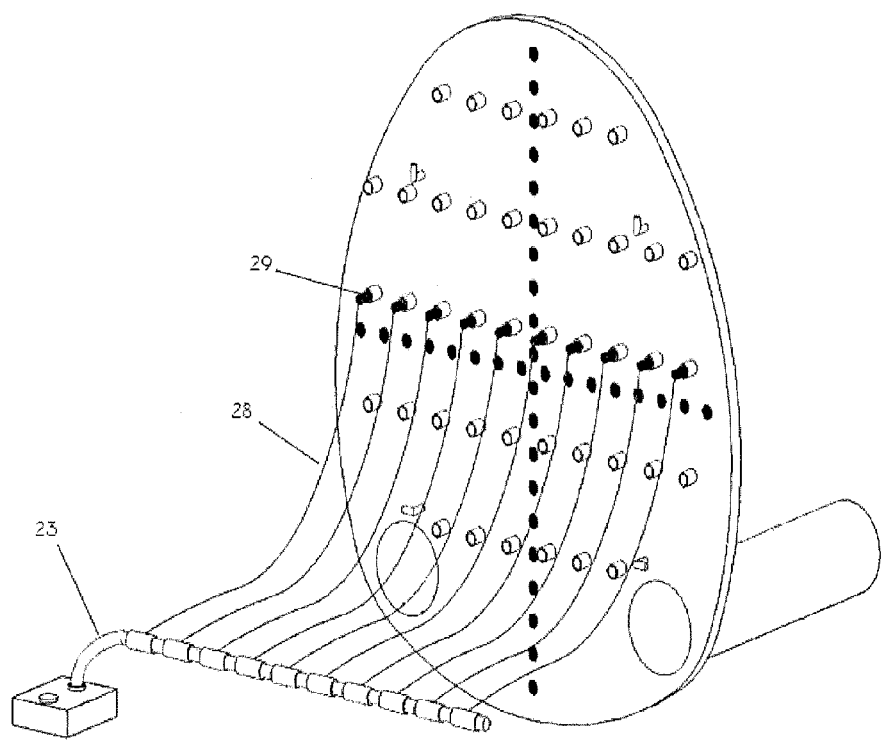
FIG. 6 is a schematic diagram showing that a main tunnel model face of the present invention is used for mounting advanced prediction electrodes in an induced polarization method or a direct-current electric method.

As shown in FIG. 6, the electrode 4 mounting holes are reserved in the tunnel model face 8 according to the measuring line arrangement requirement of a direct-current electric method or an induced polarization method, rows of holes (sequentially 1, 2, 3, 4 and 5 from top to bottom) are formed in the face from top to bottom, the distance between every two rows is 0.4 m, and the central distance of two adjacent holes of each row is 0.15 m, wherein there are respectively 6 holes in the $1^{st}$ and $5^{th}$ rows and 10 holes in the $2^{nd}$, $3^{rd}$ and $4^{th}$ rows, totally 42 holes; and each electrode 4 mounting hole is cylindrical, the open diameter is 3 cm, and the length of each cylindrical wall bus is 10 cm, so that power supply and measuring electrodes 4 may be conveniently mounted.

Four electromagnetic method coil supports are reserved on the tunnel model face 8 according to the arrangement requirement of transient electromagnetic method coils, the connecting lines of the four supports just form a rectangle, and an advanced prediction person may quickly and conveniently arrange a transmitting coil by using the four supports.

The borehole radar detection hole and the transient electromagnetic advanced probe placing hole are respectively positioned in the feet of two sides of the tunnel model, are cylindrical, and have open diameters of 0.2 m and cylindrical wall bus lengths of 1 m; and since the two holes are identical in size and equivalent in position, a borehole radar antenna or a transient electromagnetic advanced probe may be placed in any hole in actual detection. It should be noted that, when the borehole radar antenna or the transient electromagnetic advanced probe needs to be placed in a deeper position, only a PE tube or a PVC tube with the same aperture and enough length needs to be connected outside each hole.

The detailed marks are induced measuring points and receiving measuring points accurately marked by using a ruler on the tunnel model face and used for advanced detection of a seismic wave method, and a vertical measuring line and a horizontal measuring line are arranged on the tunnel model face 8 according to the measuring line arrangement requirement of the seismic wave method, wherein there are 20 measuring points at intervals of 0.1 m on the vertical measuring line and 16 measuring points at intervals of 0.1 m on the horizontal measuring line.

The wall thickness of the tunnel model face 8 is 5 cm, the cross section size of the face is completely the same as the size of the shell 9, and the tunnel model face 8 and the shell 9 are cast into a whole during manufacturing.

The tunnel model test device for geophysical field advanced detection may be completely formed by winding and casting a GFRP composite material, is light in weight and high in strength and is formed by one-time winding and integral casting, the surface of the model is smooth, the density uniformity of the inner part of the material is good, and the manufactured tunnel model test device has relatively strong electromagnetic wave transmission performance and does not produce any electromagnetic interference, so as to provide an ideal test platform for experiments and multiple geophysical instrument test in the model for advanced prediction persons.

Before the advanced prediction of the induced polarization method or the direct-current electric method, only power supply electrodes 4 and measuring electrodes are inserted into the electrode 4 mounting holes in the tunnel model face 8 and lightly knocked with a hammer to ensure good contact between the electrode 4 and the rock in front of the face, then the electrode 4 is connected to a cable 23 through a conducting wire 28, and the advanced prediction operation of the electric method may begin.

Before the advanced prediction of the transient electromagnetic method, the transmitting coil is wound and fixed on the four electromagnetic method coil supports on the tunnel model face 8, the receiving coil may randomly move in the transmitting coil, and the transient electromagnetic advanced detection probe may randomly move in the transient electromagnetic advanced probe placing hole to acquire signals. Before the advanced prediction of the borehole radar method, only the borehole radar antennas are put into the borehole radar antenna holes, instruments are connected, and the borehole radar antennas randomly move in the holes to acquire signals reflected by the front rock.

Before the advanced prediction of the seismic wave method, the marks on the tunnel model face 8 are knocked by using a shock hammer, and a detector is placed on other positions of the marks to acquire signals.

A model test case 3 is composed of a reinforced concrete structure, the size of the whole model is 17 m (length)×7.6 m (width)×6 m (height), the geometrical factor ratio G of the whole model test device is 6 (the geometrical dimension ratio of a prototype to a model), the thickness of the outer wall of the model test device is 0.4 m, a bottom plate made of reinforced concrete with the thickness of 0.7 m is adopted at the bottom joint to resist the bending moment borne by the wall, and the main tunnel and the detection boreholes are reserved on the wall. In view of the sizes of the main tunnel model 2 and the model test case 3, the model test device is a large-scale model test platform, may be closer to the actual detection condition and may reflect the detection law more really.

Figure 3:
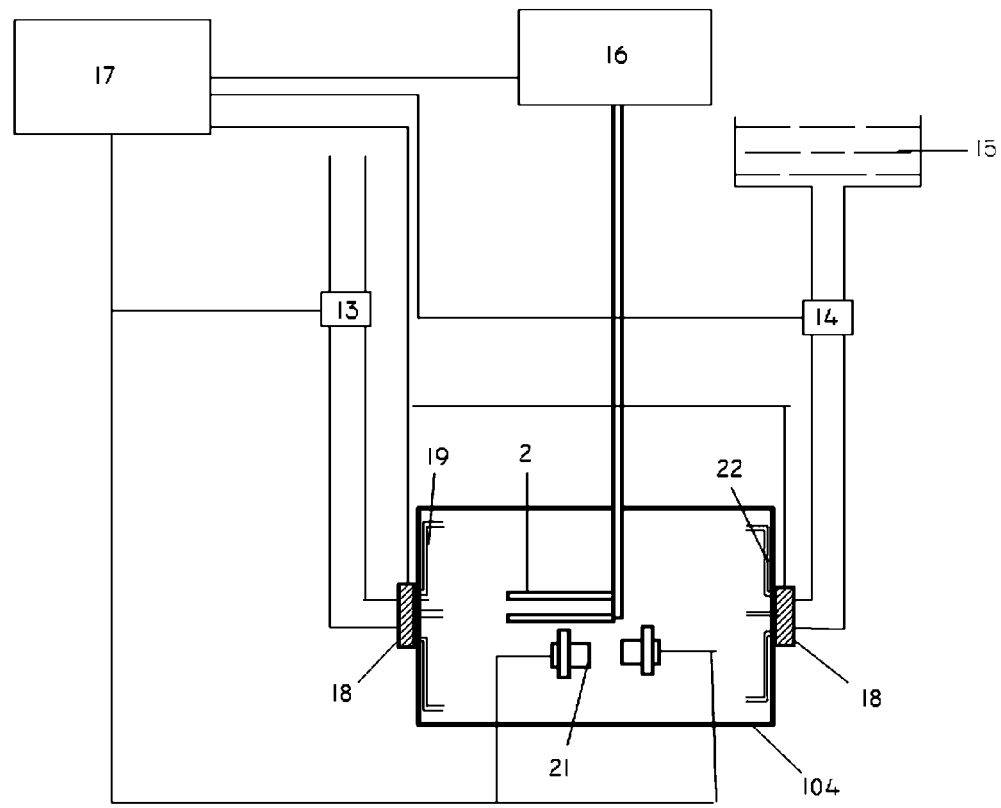
FIG. 3 is a schematic diagram of a water-containing geological structure device of the present invention.

As shown in FIG. 3, the water-containing geological structure device 4 includes a freely molded water-containing structure shell 104 with a controllable permeability coefficient, wherein a water inlet pipe 22 and a water outlet pipe 19 are mounted on two sides of the water-containing structure shell respectively, a water inlet flow control device 14 is arranged on the water inlet pipe 22, a water outlet flow control device 13 is arranged on the water outlet pipe 19, one end of the water inlet pipe 22 is connected with a water tank 15, and parts of the water inlet pipe 22 and the water outlet pipe 19, positioned in the water-containing structure shell, are respectively provided with a plurality of water inlets and water outlets forming a plurality of water passages; and the water-containing structure shell is also connected with a water wave velocity controllable device based on pneumatic powder spray.

The water inlet pipe 22 and the water outlet pipe 19 are respectively connected to the water-containing structure shell through water flow direction control devices, and parts of the water inlet pipe 22 and the water outlet pipe 19, positioned in the water-containing structure shell, are respectively divided into pipelines in multiple directions through the water flow direction control devices.

The water wave velocity controllable device includes a computer 17, wherein the computer 17 is respectively connected with an air compressor 16 and acoustic emission transducers 21, the air compressor 16 is connected with one end of a porous discharge pipe 20 inserted into the water-containing structure shell, a plurality of parallel pipelines are arranged at the other end of the porous discharge pipe 20, and the acoustic emission transducers 21 are positioned in the water-containing structure shell.

The water inlet flow control device 14 includes a flow controller, wherein the flow controller is connected with the computer 17 and also connected with a frequency converter, the frequency converter is connected with a variable frequency motor, the variable frequency motor is connected with a water inlet flow meter, and the water inlet flow meter is connected with the computer 17 and mounted in the water inlet pipe 22.

The water outlet flow control device 13 includes a flow controller, wherein the flow controller is connected with the computer 17 and also connected with a frequency converter, the frequency converter is connected with a variable frequency motor, the variable frequency motor is connected with a water outlet flow meter, and the water outlet flow meter is connected with the computer 17 and mounted in the water outlet pipe 19.

Each water flow direction control device is a three-way electromagnetic valve 18 which is connected with the computer 17.

The water-containing structure shell is molded by adopting a pervious material with good permeability and controllable permeability coefficient. The water-containing structure shell is formed by molding 1 part of cement, 1.25-2.05 parts of water granulated slag, 0.50-1.25 parts of gravel, FRP ribs and 0.3-0.75 part of water by mass.

A manufacturing method of the water-containing geological structure device 4 includes the following steps:
(1) casting the water-containing structure shell: selecting an appropriate steel mold and a template according to the type and shape of the water-containing geological structure device to be manufactured, and arranging and binding the FRP ribs at set intervals in the steel mold; selecting a mixing ratio according to the set permeability coefficient requirement, stirring the cement, water granulated slag and gravel uniformly in a stirrer, then adding water, and stirring uniformly; then pouring the mixture into the steel mold and the template, performing vibratory ramming, and molding; demolding after the set time, and curing for a few days according to the concrete curing provision;
(2) mounting the water wave velocity controllable device based on a pneumatic powder spray device: adding excessive plastic powder into water in the water-containing structure shell through the air compressor 16 to form a suspension, fixing the acoustic emission transducers 21 according to a fixed distance, fixing the porous discharge pipe 20, connecting the computer 17 with the air compressor 16 and the acoustic emission transducers 21 respectively, and connecting the air compressor 16 with the porous discharge pipe 20;
(3) mounting the water inlet and outlet flow control devices 14 and 13 and the water flow direction control devices: connecting the flow controllers with two frequency converters respectively, connecting the two frequency converters with the variable frequency motors respectively, and connecting the variable frequency motors with the water inlet flow meter and the water outlet flow meter respectively; connecting the water flow direction control devices with the computer 17, the water flow direction control devices being mounted at two ends of the water-containing structure shell; connecting the water inlet pipe 22 and the water outlet pipe 19 with the water-containing structure shell respectively;
(4) hoisting and burying the water-containing geological structure device: excavating the filled model to an appropriate depth on the multifunctional tunnel advanced geological prediction physical model test device with set length, width and height according to a designated position by using a rotary excavating device, hoisting the water-containing geological structure device to the excavated position by using a travelling hoist, burying the similar material of the excavated surrounding rock, and ramming;
(5) setting the elastic wave velocity, flow and flow direction of water through the computer 17, and controlling the corresponding devices to work.

When the water-containing structure shell is cast in (1), two holes with the diameters of 3 cm need to be reserved on two sides of the water-containing structure shell, for mounting the water inlet and outlet pipes respectively; meanwhile, a hole with the diameter of 2 cm needs to be reserved in the shell, for mounting a porous discharge pipe 20 connecting pipe in the water-containing geological structure device; in addition, a square hole of 0.2×0.2 m also needs to be reserved in the water-containing structure shell, a cover matching the size of the square hole is manufactured, the square hole is used for filling a solid filling material, and the manufactured cover is fixed on the shell by using bolts after filling to plug the reserved square hole.

With respect to the working principle of the water wave velocity controllable device based on pneumatic powder spray, because the wave velocity of water is higher than the expectation, the wave velocity of the water is controllably adjusted by adopting the plastic powder suspension. In the plastic powder suspension, the content of the plastic powder would affect the wave velocity, namely the higher the content is, the lower the wave velocity is; and the content of the plastic powder in the plastic powder suspension is controlled through the power of the air compressor 16, and when the power is high, the more the uniform bubbles produced by the porous discharge pipe 20 are, the more the plastic powder blown in the suspension is, and the higher the content of the plastic powder in the suspension is. Therefore, the wave velocity controllability is adjusted by feedback: the excessive plastic powder is added into the water, the computer controls the air compressor 16 to work at the power of 200 KW, and uniform bubbles are produced in the porous discharge pipe 20, so that the plastic powder is suspended in the water; meanwhile, the acoustic emission probe works, the wave velocity of the elastic wave of the suspension is tested and fed back to the computer 17 in real time, and when the wave velocity is higher than or lower than a predicted value, the computer 17 adjusts the working power (50-370 KW) of the air compressor 16 to reduce or increase the content of the plastic powder in the water, so that the wave velocity rises or declines and real-time controllable adjustment of the wave velocity of the water is realized.

With respect to the working principle of the water inlet flow control device 14 and the water outlet flow control device 13, the flow controllers are controlled through the computer 17 and control the variable frequency motors through the frequency converters at the water inlet end and the water outlet end respectively to control the water inlet and outlet quantities, the water inlet and outlet flow meters feed the water inlet and outlet quantities back to the computer 17 in real time, and the flow controllers control the frequency converters in real time according to the feedback information received by the computer 17 and display real-time flow and total water quantity at the same time.

The water-containing structure shell is molded in a manner similar to concrete casting by adopting the pervious material with good permeability and controllable permeability coefficient. The shell is molded by adopting a wood template and may be freely molded in different shapes, and the shape of the wood template is selected according to the shapes of different geological bodies such as underground rivers, karst caves and fault zones to be simulated, so that the different geological bodies such as underground rivers, karst caves and fault zones may be simulated.

Figure 4:
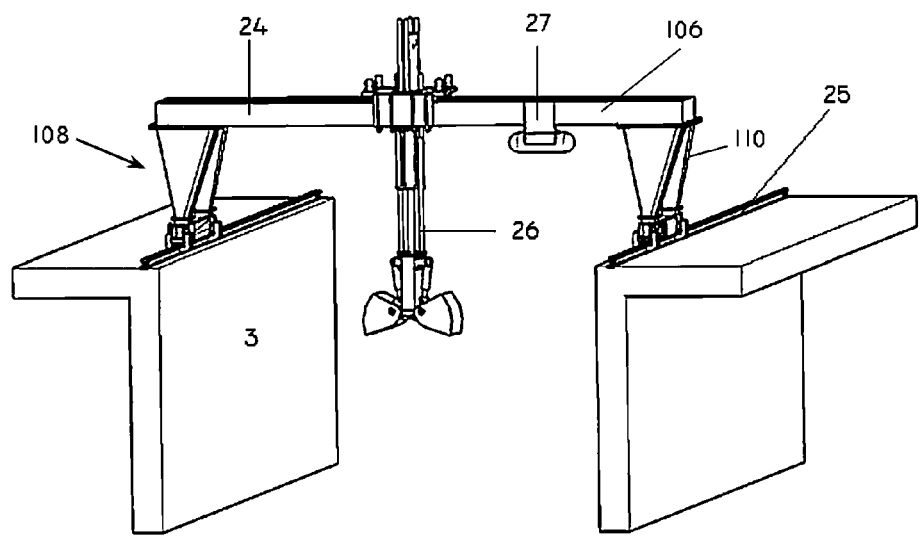
FIG. 4 is a schematic diagram of a numerical control automated construction device of the present invention.

As shown in FIG. 4, the numerical control automated construction device 5 includes horizontal guide rails 25 fixed at the top ends of model test side walls, a double girder gantry crane 24 moving on the horizontal guide rails 25 along the direction of the guide rails, a 360° rotatable soil taking device 26 and an abnormal body carrying device 27 which are mounted on the double girder gantry crane 24, and an integrated numerical control operating system for realizing the functions of ranging, feedback and real-time display.

The double girder gantry crane 24 moves along the horizontal guide rails 25, and the 360° rotatable soil taking device 26 moves along the double girder gantry crane 24 or moves vertically downwards. The double girder gantry crane 24 consists of a full-gantry main girder 106 and leg supports 108—fixed at two ends of the full-gantry main girder, wherein the main girder has a double-girder structure, a trolley track is designed on the main girder, and each single girder of the main girder is designed into a box girder structure.

Each leg support includes two oblique legs 110, an end girder at the bottom and a travelling mechanism, wherein the two oblique legs form an A-shaped support and are connected with the travelling mechanism through the end girder at the bottom. Steel plate buckles for preventing the crane from being separated from the track are designed on two sides of the travelling mechanism.

The 360° rotatable soil taking device 26 includes a four-wheeled trolley, a rotating mechanism, a guide rod, a grab bucket and a main hydraulic system. The four-wheeled trolley moves on the trolley track of the full-gantry main girder, the guide rod is connected with the four-wheeled trolley through a guide rod hole in the four-wheeled trolley and connected with the grab bucket through the rotating mechanism, and the main hydraulic system is used for driving the rotation and normal operation of the grab bucket and the extension and retraction of the guide rod; and the soil taking device solves the problems of deep soil excavation and taking, carrying of soil on the top of the model and soil backfilling, and the grab bucket may rotate for 360°, so that abnormal bodies in different directions may be buried.

The abnormal body carrying device 27 includes a hoist and a travelling component of the hoist, is arranged on one single girder of the main girder, moves along the single girder, retracts to one side of the girder when not in use at ordinary times, may move to a designated position as needed in work to hoist the abnormal bodies and may complete the carrying, burying and taking-out operations of the abnormal bodies. The integrated numerical control operating system may realize the ranging and feedback functions and display the working state of the whole device in real time, and is designed to have an automatic control mode and a manual control mode.

After three-dimensional coordinates (X, Y, Z) of a pre-buried abnormal body in the soil body of the model are deteimined, the double girder gantry crane 24 moves to the coordinate X along the horizontal guide rails 25, the 360° rotatable soil taking device 26 moves to the coordinate Y along the double girder gantry crane 24, and the 360° rotatable soil taking device 26 vertically downwards moves to the coordinate Z.

Figure 5:
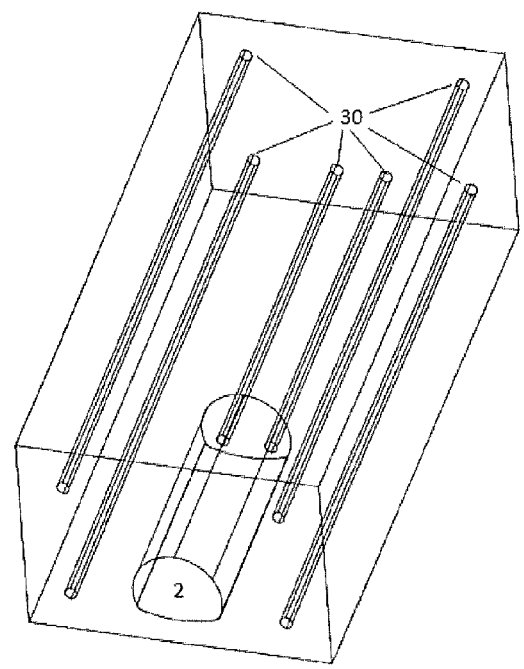
FIG. 5 is a three-dimensional distribution schematic diagram of detection boreholes of the present invention.

As shown in FIG. 5, there are totally three pairs of horizontal detection boreholes 30, wherein one pair of boreholes is positioned in front of the main tunnel face 8 and used for mounting of a transient electromagnetic method advanced probe, mounting of a resistivity CT method electrode and delivery of a borehole radar method antenna, and the other two pairs of boreholes in which electrodes are mounted penetrate through the whole model test device and are respectively positioned at the upper left, upper right, lower left and lower right parts of the model test device and used for detection of a resistivity CT method and a borehole radar method.

The detection of the borehole radar method includes the following specific detect test steps:

1, pre-burying of a geological abnormal body: after the three-dimensional position of the pre-buried geological abnormal body in the model test is determined, performing quick three-dimensional positioning excavation in the tunnel surrounding rock of the model test by using the automated construction device, then carrying and burying the water-containing structure to a predefined position, and finally backfilling and ramming the tunnel surrounding rock material;

2, connection of detection devices and test:

(1) selection of horizontal detection boreholes: selecting any two boreholes according to the three-dimensional position of the pre-buried water-containing structure, to ensure that the water-containing geological structure device is positioned between two horizontal detection boreholes for detection of the cross-hole radar method;

(2) connection of devices: connecting a radar host, a notebook computer, two borehole radar antennas, a power supply and other matched detection devices;

(3) detection and verification of detection results.

Firstly, one borehole radar antenna is used as a receiving antenna and delivered to the deepest part of one horizontal detection borehole, and the other borehole radar antenna is used as a transmitting antenna and also delivered to the deepest part of the other horizontal detection borehole.

Then, the radar host is controlled by the notebook computer to perform first radar data acquisition, then the transmitting antenna is moved outwards from the borehole for a detection distance m and the receiving antenna is immobile, second radar data acquisition is performed, the transmitting antenna is moved outwards for the detection distance m every time till moving away from a detection area, and third, fourth . . . n$^{th}$ detection are performed, wherein n and m are natural numbers.

Similarly, the two borehole radar antennas are delivered to the deepest parts of the original horizontal detection boreholes, the original transmitting antenna is used as a receiving antenna and is immobile, and the original receiving antenna is used as a transmitting antenna to perform n times of radar data acquisition.

Finally, the acquired radar data are subjected to geophysical inversion, and a radar detection response waveform graph of the water-containing geological structure device is obtained, so that the information such as position and size of the water-containing geological structure device in the detection area is obtained; and the information is compared and verified with the actual condition.

Embodiment 2:

A tunnel construction large-scale integrated geophysical advanced detection model test device includes a tunnel surrounding rock 1, a main tunnel model 2, a model test case 3, a water-containing geological structure device 4, a numerical control automated construction device 5, horizontal detection boreholes 30 and a main control chamber 6, wherein the tunnel surrounding rock 1 is filled in the model test case 3, the main tunnel model 2 is positioned in the middle of the front of the model test case 3, the water-containing geological structure device 4 is arranged in front of the main tunnel model 2, the numerical control automated construction device 5 is mounted on the top of the model test case 3, the horizontal detection boreholes 30 are arranged in the model test device, and the main control chamber 6 is positioned outside the model test case 3 and communicates with the main tunnel model 2, the water-containing geological structure device 4 and the numerical control automated construction device 5.

For the proportion of the tunnel surrounding rock and the arrangement and preparation method of other devices, reference is made to embodiment 1.

The induced polarization method includes the following specific detection test steps:

1, pre-burying of a geological abnormal body: after the three-dimensional position of the pre-buried geological abnormal body in the model test is determined, performing quick three-dimensional positioning excavation in the tunnel surrounding rock of the model test by using the automated construction device, then carrying and burying the water-containing structure to a predefined position, and finally backfilling and ramming the tunnel surrounding rock material;

2, connection of detection devices and test:

(1) selection of detection electrodes, wherein the induced polarization method needs five rows of electrodes on the tunnel model face 8 and detection electrodes pre-arranged 0.5 m, 1 m, 1.5 m, 2 m, 2.5 m, 3 m, 3.5 m, 4 m, 4.5 m, 5 m and 5.5 m away from the tunnel model face on the tunnel cavity;

(2) connection of devices: connecting an induced polarization method host and a power supply, and connecting all the used detection electrodes with the host;

(3) detection and verification of detection results.

Firstly, the detection electrode 0.5 m away from the tunnel model face on the tunnel cavity is used as a power supply electrode, the five rows of electrodes on the face are used as receiving electrodes, and signals are sequentially received from the first row to the fifth row to perform first detection; similarly, the detection electrodes 1 m, 1.5 m, 2 m, 2.5 m, 3 m, 3.5 m, 4 m, 4.5 m, 5 m and 5.5 m away from the tunnel model face on the tunnel cavity are used as power supply electrodes, the five rows of electrodes on the tunnel model face 8 are used as receiving electrodes, and signals are sequentially received from the first row to the fifth row to perform $2^{nd}$, $3^{rd}$ . . . $11^{th}$ detection;

finally, the acquired detection data are subjected to geophysical inversion, and response results of the water-containing geological structure device are obtained, so that the information such as three-dimensional position and size of the detected water-containing geological structure device is obtained; and the information is compared and verified with the actual condition.

Although the specific implementations of the present invention are described above in combination with the accompanying drawings, the protection scope of the present invention is not limited thereto. Those skilled in the art to which the present invention pertains should understand that, various modifications or variations, made on the basis of the technical schemes of the present invention by those skilled in the art without any creative effort, are still within the protection scope of the present invention.

The invention claimed is:

1. A tunnel construction large-scale integrated geophysical advanced detection model test device, comprising a tunnel surrounding rock, a main tunnel model, a model test case having a front and a top, a water-containing geological structure device, a numerical control automated construction device, horizontal detection boreholes and a main control chamber, wherein the tunnel surrounding rock is filled in the model test case, the main tunnel model of a model test is positioned in the middle of the front of the model test case, the water-containing geological structure device is arranged in front of the main tunnel model, the numerical control automated construction device is mounted on the top of the model test case, the horizontal detection boreholes are arranged in the model test device, and the main control chamber is positioned outside the model test case and communicates with the water-containing geological structure device and the numerical control automated construction device;

the tunnel surrounding rock is used for simulating the condition of the tunnel surrounding rock in actual tunnel construction and is a similar material simultaneously meeting the requirements of seismic wave field, electromagnetic field and direct-current electric field detection for resistivity and wave velocity, and the similar material is formed by mixing and compacting the following components in parts by mass:

| | |
|---|---|
| soil | 100 parts |
| cement | 4-20 parts |
| gravel | 10-25 parts, | wherein water ratio of the soil is controlled to be 8-16%, and compactness of the whole similar material is controlled to be 0.75-0.95; the soil and the gravel are aggregates of the similar material, the cement is a cementing agent, the gravel is 3-4 meshes, and the cement is directly mixed as dry powder; and the wave velocity of the similar material is 230-1,260 m/s, and resistivity of the similar material is 20-340 Ωm.

2. An integrated geophysical advanced detection method using the detection model test device of claim 1, comprising the following detection steps:
(1) pre-burying of a geological abnormal body: after the three-dimensional position of the pre-buried geological abnormal body in the model test is determined, performing quick three-dimensional positioning excavation in the tunnel surrounding rock by using the numerical control automated construction device, carrying and burying the water-containing geological structure device to a predefined position in front of the main tunnel model, and backfilling and ramming the tunnel surrounding rock;
(2) connection of detection devices and detection test, specifically comprising:
1) selection of a detection method and connection of devices: selecting a detection method according to the test requirement, the detection method including an induced polarization method, a transient electromagnetic method, a seismic wave method, a borehole radar method and a resistivity CT method, and connecting the detection devices matched with the detection method for the geophysical advanced detection test;
2) selection of electrodes and horizontal detection boreholes: selecting the electrodes or the horizontal detection boreholes required for the corresponding method according to the selected detection method, wherein the induced polarization method needs the electrodes arranged on the main tunnel face and the tunnel cavity, and the borehole radar method and the resistivity CT method need two random boreholes selected according to the three-dimensional position of the pre-buried water-containing geological structure device, so as to ensure that the water-containing geological structure device is positioned between the horizontal detection boreholes;
3) detection and verification of detection results: performing various geophysical advanced detections under the coordination action of the detection devices and the electrodes or the boreholes, performing geophysical inversion on the acquired detection data to obtain response results of the water-containing geological structure device so as to obtain information including the three-dimensional position and size of the detected water-containing geological structure device, and verify the information with three-dimensional position and size of the actual buried water-containing geological structure device to judge the accuracy of various detection methods.

3. The tunnel construction large-scale integrated geophysical advanced detection model test device of claim 1, wherein the model test case has a reinforced concrete structure, the geometrical factor ratio G of the whole model test device is 6, and the geometrical factor ratio is the geometrical dimension ratio of a prototype to a model.

4. The tunnel construction large-scale integrated geophysical advanced detection model test device of claim 1, wherein there are totally three pairs of horizontal detection boreholes, one pair of boreholes is positioned in front of the main tunnel face and used for mounting of a transient electromagnetic method advanced probe, mounting of a resistivity CT method electrode and delivery of a borehole radar method antenna, and the other two pairs of boreholes in which measuring electrodes are mounted penetrate through the whole model test device and are respectively positioned at upper left, upper right, lower left and lower right parts of the model test device and used for detection of a resistivity CT method and a borehole radar method.

5. The tunnel construction large-scale integrated geophysical advanced detection model test device of claim 1, wherein the main control chamber is used for controlling and displaying each operation in the test, and communicates with the water-containing geological structure device and the numerical control automated construction device.

6. The tunnel construction large-scale integrated geophysical advanced detection model test device of claim 1, wherein a preparation method of the tunnel surrounding rock comprises the following steps:
(1) finding out the values of appropriate water ratio and compactness according to the resistivity and wave velocity parameters of required materials and the relationship curve among the wave velocity, resistivity, water ratio and compactness;
(2) excavating a plurality of underground soil samples, drying, exposing in the sun or adding water to ensure that the water ratio of the soil reaches the predefined water ratio, and sieving out a plurality of gravel with the diameters of 3-4 meshes through a sieve;
(3) respectively weighing the raw materials, putting the raw materials into a stirrer and fully stirring the raw materials;
(4) putting the mixed material into a model, stacking layer by layer, and performing artificial ramming to reach the predefined compactness.

7. The tunnel construction large-scale integrated geophysical advanced detection model test device of claim 1, wherein the main tunnel model comprises a tunnel model face and a tunnel model cavity which are connected with each other to form a whole; the tunnel model cavity is divided into an inner layer and an outer layer, the inner layer comprises a shell and annular inner reinforcing ribs positioned in the shell and used for restraining the radial deformation of the shell, and the outer layer is provided with annular outer reinforcing ribs and axial outer reinforcing ribs positioned outside the shell and used for restraining the radial and axial deformation of the tunnel model cavity respectively; and electrode mounting holes, electromagnetic method coil supports, a borehole radar detection hole and a transient electromagnetic advanced probe placing hole are arranged on the tunnel model face respectively, seismic wave method induced measuring points and receiving measuring points are arranged on the tunnel model face, the cross section of the inner layer shell of the tunnel model cavity has a symmetrical structure formed by six arcs of a five-center circle, and the whole cross section is in the shape of a pebble which has a narrower top and a wider bottom and is smooth on the circumference.

8. The tunnel construction large-scale integrated geophysical advanced detection model test device of claim 7, wherein the borehole radar detection hole and the transient electromagnetic advanced probe placing hole are positioned in the feet of two sides of the tunnel model face respectively, and are cylindrical and identical in size.

9. The tunnel construction large-scale integrated geophysical advanced detection model test device of claim 7, wherein the electrode mounting holes are cylindrical and are reserved in the tunnel model face according to the measuring line arrangement requirement of a direct-current electric method or an induced polarization method, and electrodes are mounted in the electrode mounting holes according to actual needs.

10. The tunnel construction large-scale integrated geophysical advanced detection model test device of claim 7, wherein four electromagnetic method coil supports are reserved on the tunnel model face according to the arrangement requirement of transient electromagnetic method coils, and the four supports form a rectangle.

11. The tunnel construction large-scale integrated geophysical advanced detection model test device of claim 1, wherein the water-containing geological structure device comprises a freely molded water-containing structure shell with a controllable permeability coefficient, a water inlet pipe, a water outlet pipe, a water inlet flow control device, a water outlet flow control device, a water tank and a water wave velocity controllable device, wherein the water inlet pipe and the water outlet pipe are arranged on two sides of the water-containing structure shell respectively, the water inlet flow control device is fixed on the water inlet pipe, the water outlet flow control device is arranged on the water outlet pipe, one end of the water inlet pipe is connected with the water tank, and parts of the water inlet pipe and the water outlet pipe, positioned in the water-containing structure shell, are respectively provided with a plurality of water inlets and water outlets forming a plurality of water passages; and the water-containing structure shell is also connected with the water wave velocity controllable device based on pneumatic powder spray.

12. The tunnel construction large-scale integrated geophysical advanced detection model test device of claim 11, wherein the water-containing structure shell is molded by adopting a pervious material with good permeability and controllable permeability coefficient, and the water-containing structure shell is formed by molding 1 part of cement, 1.25-2.05 parts of water granulated slag, 0.50-1.25 parts of gravel, FRP ribs and 0.3-0.75 part of water by mass.

13. The tunnel construction large-scale integrated geophysical advanced detection model test device of claim 11, wherein the water wave velocity controllable device comprises a computer, the computer is respectively connected with an air compressor and acoustic emission transducers, the air compressor is connected with one end of a porous discharge pipe inserted into the water-containing structure shell, a plurality of parallel pipelines are arranged at the other end of the porous discharge pipe, and the acoustic emission transducers are positioned in the water-containing structure shell.

14. The tunnel construction large-scale integrated geophysical advanced detection model test device of claim 11, wherein the water inlet flow control device comprises a flow controller, the flow controller is connected with the computer and also connected with a frequency converter, the frequency converter is connected with a variable frequency motor, the variable frequency motor is connected with a water inlet flow meter, and the water inlet flow meter is connected with the computer and mounted in the water inlet pipe.

15. The tunnel construction large-scale integrated geophysical advanced detection model test device of claim 11, wherein the water outlet flow control device comprises a flow controller, the flow controller is connected with the computer and also connected with a frequency converter, the frequency converter is connected with a variable frequency motor, the variable frequency motor is connected with a water outlet flow meter, and the water outlet flow meter is connected with the computer and mounted in the water outlet pipe.

16. The tunnel construction large-scale integrated geophysical advanced detection model test device of claim 11, wherein the water inlet pipe and the water outlet pipe are respectively connected to the water-containing structure shell through water flow direction control devices, and parts of the water inlet pipe and the water outlet pipe, positioned in the water-containing structure shell, are respectively divided into pipelines in multiple directions through the water flow direction control devices.

17. The tunnel construction large-scale integrated geophysical advanced detection model test device of claim 16, wherein the water flow direction control device is a three-way electromagnetic valve which is connected with the computer.

18. The tunnel construction large-scale integrated geophysical advanced detection model test device of claim 11, wherein a manufacturing method of the water-containing geological structure device comprises the following steps:
    (1) casting the water-containing structure shell: selecting an appropriate steel mold and a template according to the type and shape of the water-containing structure to be manufactured, and arranging and binding the FRP ribs at set intervals in the steel mold; selecting a mixing ratio according to the set permeability coefficient requirement, stirring the cement, water granulated slag and gravel uniformly in a stirrer, then adding water, and stirring uniformly; then pouring the mixture into the steel mold and the template, performing vibratory ramming, and molding; demolding after the set time, and curing for a few days according to the concrete curing provision;
    (2) mounting the water wave velocity controllable device based on pneumatic stirring: adding excessive plastic powder into water in the water-containing structure shell through the air compressor to form a suspension, fixing the acoustic emission transducers according to a fixed distance, fixing the porous discharge pipe, connecting the computer with the air compressor and the acoustic emission transducers respectively, and connecting the air compressor with the porous discharge pipe;
    (3) mounting the water inlet and outlet flow control devices and the water flow direction control devices: connecting the flow controllers with two frequency converters respectively, connecting the two frequency converters with the variable frequency motors respectively, and connecting the variable frequency motors with the water inlet flow meter and the water outlet flow meter respectively; connecting the water flow direction control devices with the computer, the water flow direction control devices being mounted at two ends of the water-containing structure shell; connecting the water inlet pipe and the water outlet pipe with the water-containing structure shell respectively;
    (4) hoisting and burying the water-containing geological structure device: excavating the filled model to an appropriate depth on the multifunctional tunnel advanced geological prediction physical model test device with set length, width and height according to a designated position by using a rotary excavating device, hoisting the water-containing geological structure device to the excavated position by using a travelling hoist, burying the similar material of the excavated surrounding rock, and ramming;
    (5) setting the elastic wave velocity, flow and flow direction of water through the computer, and controlling the corresponding devices to work.

19. The tunnel construction large-scale integrated geophysical advanced detection model test device of claim 18, wherein when the water-containing structure shell is cast in (1), two holes with the diameters of 3 cm need to be reserved on two sides of the water-containing structure shell, for mounting the water inlet and outlet pipes respectively; meanwhile, a hole with the diameter of 2 cm needs to be reserved in the shell, for mounting a porous discharge pipe connecting pipe in the water-containing structure; in addition, a square hole of 0.2×0.2 m also needs to be reserved in the water-containing structure shell, a cover matching the size of the square hole is manufactured, the square hole is used for filling a solid filling material, and the manufactured cover is fixed on the shell by using bolts after filling to plug the reserved square hole.

20. The tunnel construction large-scale integrated geophysical advanced detection model test device of claim 1, wherein the numerical control automated construction device comprises horizontal guide rails fixed at the top end of the model test case, a double girder gantry crane moving on the horizontal guide rails along the direction of the guide rails, a 360° rotatable soil taking device and an abnormal body carrying device which are mounted on the double girder gantry crane, and an integrated numerical control operating system for realizing the functions of ranging, feedback and real-time display; and the double girder gantry crane moves along the horizontal guide rails, and the 360° rotatable soil taking device moves along the double girder gantry crane or moves vertically downwards.

21. The tunnel construction large-scale integrated geophysical advanced detection model test device of claim 20, wherein the integrated numerical control operating system may realize the ranging and feedback functions and display the working state of the whole device in real time, and is designed to have an automatic control mode and a manual control mode.

22. The tunnel construction large-scale integrated geophysical advanced detection model test device of claim 20, wherein the double girder gantry crane consists of a full-gantry main girder and leg supports fixed at two ends of the full-gantry main girder, the main girder has a double-girder structure, a trolley track is designed on the main girder, and each single girder of the main girder is designed into a box girder structure.

23. The tunnel construction large-scale integrated geophysical advanced detection model test device of claim 22, wherein the 360° rotatable soil taking device comprises a four-wheeled trolley, a rotating mechanism, a guide rod, a grab bucket and a main hydraulic system;

the four-wheeled trolley moves on the trolley track of the full-gantry main girder, the guide rod is connected with the four-wheeled trolley through a guide rod hole in the four-wheeled trolley and connected with the grab bucket through the rotating mechanism, the guide rod is telescopic, and the main hydraulic system is used for driving the rotation and normal operation of the grab bucket and the extension and retraction of the guide rod.

24. The tunnel construction large-scale integrated geophysical advanced detection model test device of claim 22, wherein the abnormal body carrying device comprises a hoist and a travelling component connected with the hoist, wherein the travelling component moves along one single girder of the main girder of the double girder gantry crane.

25. The tunnel construction large-scale integrated geophysical advanced detection model test device of claim 22, wherein each leg support comprises two oblique legs, an end girder at the bottom and a travelling mechanism; and the two oblique legs form an A-shaped support and are connected with the travelling mechanism through the end girder at the bottom.

26. The tunnel construction large-scale integrated geophysical advanced detection model test device of claim 25, wherein steel plate buckles for preventing the crane from being separated from the track are designed on two sides of the travelling mechanism.

\* \* \* \* \*